United States Patent [19]

Michalko

[11] 4,250,058
[45] * Feb. 10, 1981

[54] METHOD OF PREPARING SPHEROIDAL ALUMINA PARTICLES

[75] Inventor: Edward Michalko, Hemet, Calif.

[73] Assignee: UOP Inc., Des Plaines, Ill.

[*] Notice: The portion of the term of this patent subsequent to Nov. 19, 1996, has been disclaimed.

[21] Appl. No.: 39,975

[22] Filed: May 17, 1979

Related U.S. Application Data

[63] Continuation-in-part of Ser. No. 884,291, Mar. 6, 1978, abandoned.

[51] Int. Cl.$^3$ .................. B01J 21/04; B01J 37/00; B01F 7/02
[52] U.S. Cl. .................. 252/448; 252/463; 423/628
[58] Field of Search ............... 252/448, 463; 423/623

[56] References Cited

U.S. PATENT DOCUMENTS 2,620,314  12/1952  Hoekstra ........................ 252/448
3,887,493  6/1975  Hayes ........................... 252/448

Primary Examiner—W. J. Shine
Attorney, Agent, or Firm—James R. Hoatson, Jr.; Robert W. Welch; William H. Page, II

[57] ABSTRACT

A method of preparing spheroidal alumina particles of improved physical stability is disclosed. Alumina hydrogel particles prepared by the oil-drop method are aged in the forming oil at atmospheric pressure conditions and at a temperature of from about 95° to 105° C. until the hydrogel spheres achieve a pH in excess of 6 to about 7.5. The forming oil is thereafter displaced with an ammonium salt-buffered aqueous ammoniacal solution, and the hydrogel spheres aged therein for a brief period. After further aging in an aqueous ammoniacal solution in accordance with prior art practice, the spheres are water-washed, dried and calcined.

7 Claims, No Drawings

METHOD OF PREPARING SPHEROIDAL ALUMINA PARTICLES

CROSS-REFERENCE TO RELATED APPLICATION

This application is a Continuation-In-Part of a copending application Ser. No. 884,291 filed Mar. 6, 1978 and now abandoned.

This invention relates to the manufacture of spheroidal alumina particles of macro dimension and of improved physical stability. Spheroidal alumina particles offer numerous advantages, particularly when employed as a catalyst or as a catalyst support or carrier material in a fixed bed type of operation. When so employed, said particles permit a more uniform packing whereby variations in pressure drop across the bed are minimized, and the tendency of a reactant stream to channel through the bed out of effective contact with the catalyst is substantially obviated.

In many applications, the performance of these spheroidal alumina particles, either as a catalyst or as a catalyst support, is judged not only on their activity, activity stability, selectivity and selectivity stability with respect to a particular conversion process, but also on their physical stability or durability. Physical stability is of particular importance in applications where catalyst particles are subjected to vibration and general movement in a reactor or converter. Although the average particle strength may be quite acceptable, it is the disintegration of the relatively weak particles which leads to catalyst loss and the formation of fines which accumulate to plug retaining screens and effect an undue pressure drop across a catalyst bed. In addition, the disintegration of weaker particles of a tightly packed bed promotes excessive movement of the remaining particles in contact with each other resulting in further loss of catalyst through abrasion.

Spheroidal alumina particles of macro dimension (1/32 to ⅛" dia.) are advantageously manufactured by the well known oil-drop method substantially as described by Hoekstra in U.S. Pat. No. 2,620,314. Briefly, the method comprises commingling an acidic alumina hydrosol with a gelling agent characterized as a weak base which hydrolizes to ammonia with increasing temperature, and dispersing the mixture as droplets in a hot oil bath, frequently referred to as forming oil, and generally contained in a vertical column or forming tower. The forming oil is typically a light gas oil chosen principally for its high interfacial tension with respect to water. Thus, as each droplet penetrates the oil surface, it draws into a spherical shape. The droplets are principally water at this stage and, being insoluble in the oil, they tend to assume a shape having the least surface area for its volume. A second effect is that the formed hydrosol droplets gravitating to the bottom of the forming oil are progressively gelled to a stage sufficient to maintain the structural integrity of the resulting hydrogel spheres during the subsequent processing thereof. In any case, the formed hydrogel spheres are subsequently aged, usually in the hot forming oil, and thereafter ammonia aged, washed, dried and calcined, usually in an oxidizing atmosphere at a temperature of from about 425° to about 750° C.

Spheroidal alumina particles manufactured by the described oil-drop method frequently reveal stress cracks or fractures under microscopic examination which portend the premature disintegration of the spheres, and said stress cracks or fractures assume greater importance as the conditions to which the spheres are exposed become more severe. U.S. Pat. No. 3,887,492 attributes the problem to an osmotic swelling of the hydrogel spheres during the alkaline aging process, the osmotic swelling resulting from the salt concentration gradient between the aqueous phase of the formed hydrogel spheres and the aqueous media in which they are subsequently aged. As a solution to the problem, the patent teaches the transfer of the formed hydrogel spheres from the forming oil to an aqueous salt solution having a pH of at least about 5.5 and a salt concentration substantially equivalent to that of the aqueous phase of said hydrogel spheres. The salt concentration of the aqueous solution is gradually reduced until the solution is salt-free.

Pursuant to one embodiment of the present invention, spheroidal alumina particles are produced substantially free of said stress cracks or fractures by the method which comprises commingling an acidic alumina hydrosol with an ammonia precursor at below gelation temperature; dispersing the mixture as droplets in a hot oil bath at a temperature effecting decomposition of said ammonia precursor and gelation of said hydrosol; aging the resulting hydrogel spheres in said oil bath at about atmospheric pressure conditions and at a temperature of from about 95° to about 105° C. until said spheres achieve a pH in excess of 6 to about 7.5; thereafter displacing said oil bath with an ammonium salt-buffered aqueous ammoniacal solution containing from about 0.5 to about 10 wt.% ammonium salt and from about 0.1 to about 1 wt.% ammonia, and retaining the spheres in said solution for at least about 15 minutes; separating and further aging the hydrogel spheres in an aqueous ammoniacal solution containing from about 0.5 to about 3 wt.% ammonia for a period of from about 1 to about 24 hours; and water-washing, drying and calcining the spheroidal alumina product.

One of the more specific embodiments of this invention relates to a method of manufacturing spheroidal alumina particles which comprises commingling an aluminum hydroxychloride sol, characterized by an aluminum/chloride anion weight ratio of from about 1.0 to about 1.5, with hexamethylenetetramine at below gelation temperature; dispersing the mixture as droplets in a hot oil bath maintained at a temperature of from about 50° to 100° C.; aging the resulting hydrogel spheres in said oil bath at atmospheric pressure conditions and at a temperature of from about 95° to about 105° C. for a period in excess of about 10 hours and until said spheres achieve a pH in excess of 6 to about 7.5; thereafter displacing said oil bath with an ammonium chloride-buffered aqueous ammoniacal solution containing from about 0.5 to about 10 wt.% ammonium chloride and from about 0.1 to about 1 wt.% ammonia and retaining the spheres in said solution for at least about 15 minutes; separating and further aging the hydrogel spheres in an aqueous ammoniacal solution containing from about 0.5 to about 3 wt.% ammonia for a period of from about 1 to about 24 hours; and water-washing, drying and calcining this spheroidal alumina product at a temperature of from about 425° to about 750° C.

Other objects and embodiments of this invention will become apparent in the following detailed specification.

Acidic alumina hydrosols for use herein include such as are prepared by the hydrolysis of a suitable concentration of an aluminum salt in aqueous solution at conditions to lower or reduce the acid anion concentration thereof, for example, by neutralization. The olation reaction induced by the reduction in acid anion concentration yields a hydrosol comprising inorganic polymers of colloidal dimension dispersed and suspended in the aqueous media. For example, an aqueous aluminum chloride solution of suitable concentration, treated at conditions to reduce the chloride anion concentration and provide an aluminum/chloride weight ratio of from about 1:1 to about 1.5:1, will yield an acidic alumina hydrosol such as herein contemplated. The acid anion concentration is lowered or reduced by conventional methods known to the art. Thus, the acid anion concentration can be reduced by using aluminum metal as a neutralizing agent. In this case, the salt of neutralization is itself an aluminum salt subject to further hydrolysis and ultimate sol formation. In some cases, as in the case of aluminum acetate, where the acid anion is sufficiently volatile, the desired acid anion deficiency is created simply by heating. Another method of producing an acidic alumina hydrosol is in the electrolysis of an aluminum salt solution, for example, an aqueous aluminum chloride solution, in an electrolytic cell having a porous partition between the anode and the cathode whereby an acid anion deficiency is created in the cathode compartment with a formation of an alumina hydrosol therein.

Preferably, the acidic alumina hydrosol is an aluminum chloride hydrosol variously referred to as an aluminum oxychloride hydrosol, aluminum hydroxychloride hydrosol, and the like, such as is formed utilizing aluminum metal as a neutralizing agent in conjunction with an aqueous aluminum chloride solution. The aluminum chloride hydrosol is typically prepared by digesting aluminum in aqueous hydrochloric acid and/or aluminum chloride solution to about reflux temperature, usually from about 80° to about 105° C., and reducing the chloride anion concentration of the resulting aluminum chloride solution by the device of maintaining an excess of the aluminum reactant in the reaction mixture as a neutralizing agent. In any case, the aluminum chloride hydrosol is prepared containing aluminum in from about a 1:1 to about a 1.5:1 weight ratio with the chloride anion content thereof.

Ammonia precursors suitable for use as a setting or neutralizing agent in conjunction with the oil-drop method are described as weakly basic materials substantially stable at normal temperatures but hydrolyzable or decomposable to ammonia with increasing temperature. Typically, the ammonia precursor is hexamethylenetetramine or urea, or mixtures thereof. In any case, the ammonia precursor is utilized in an amount sufficient to effect, upon total hydrolysis, substantially complete neutralization of the chloride anion, or other acid anion, contained in the acidic hydrosol. Preferably, hexamethylenetetramine is utilized, and in an amount equivalent to from about a 1:4 to about a 2:4 mole ratio with the acid anion content of the acidic hydrosol. The hexamethylenetetramine is generally prepared as a 28 to 40 wt.% aqueous solution thereof and, as such, commingled with the acidic hydrosol at below gelation temperature.

The acidic hydrogel particles are typically aged in the hot forming oil at atmospheric pressure conditions for at least about 10 hours, and thereafter further ammonia aged in an aqueous ammoniacal solution to develop desirable density characteristics. The hydrogel particles will generally attain a pH of 5.5–6.0 in the hot forming oil before the oil is displaced by the aqueous ammoniacal solution having a substantially higher pH—usually a pH of about 11. It has now been determined that this "pH shock" promotes surface strain in the hydrogel particles which appears as cracks in the calcined product. This surface strain is most pronounced in those hydrogel particles first in contact with the aqueous ammoniacal solution, in all probability because of the ammonium salt which forms as the salt of neutralization and increasingly buffers the solution in the later stages of the ammonia aging process.

Surface strain, and the resultant cracking of the calcined product, is substantially obviated by the method of this invention. In accordance with the present method, the acidic hydrogel particles are aged in the forming oil at about atmospheric pressure conditions and at a temperature of from about 95° to about 105° C. until said particles achieve a pH in excess of 6 to about 7.5. The pH of the hydrogel particles is readily determined, for example, by immersing a sample thereof in deionized water and determining the resulting pH of the water. Subsequent to the oil age and prior to the ammonia age, the forming oil is displaced with an ammonium salt-buffered aqueous ammoniacal solution containing from about 0.5 to about 10 wt.% of said ammonium salt and from about 0.1 to about 1 wt.% ammonia. The ammonium salt is preferably ammonium chloride although other ammonium halides, ammonium nitrate, ammonium sulfate, ammonium acetate and the like are suitable. The hydrogel particles are retained in said solution for at least about 15 minutes and thereafter subjected to the above-described ammonia age pursuant to prior art practice. Thus, the hydrogel spheres are separated and further aged in an aqueous ammoniacal solution containing from about 0.5 to about 3 wt.% ammonia for a period of from about 1 to about 24 hours.

After the aging treatment, the spheroidal particles are washed in any suitable manner. A particularly satisfactory method is to wash the spheres by percolation, either with an upward or downward flow of water, and preferably with water containing a small amount of ammonium hydroxide and/or ammonium nitrate. After washing, the spheres may be dried at a temperature of from about 95° to about 315° C. for 2 to 24 hours or more, or dried at this temperature and calcined at a temperature of from about 425° to about 760° C. for 2 to 12 hours or more, and utilized as such or composited with other catalytic components. It is preferred that the spheres be dried slowly and also that the drying be effected in a humid atmosphere since it has been found to result in less breakage of the spheres.

The alumina composition prepared in accordance with the method of this invention, is advantageously employed as a support or carrier material for other catalytic components to promote various hydrocarbon conversion reactions including dehydrogenation of specific hydrocarbons or petroleum fractions, isomerization of specific hydrocarbons or petroleum fractions, hydrocracking of lower molecular weight hydrocarbons such as occur in the kerosene and gas oil boiling range, and the oxidation of hydrocarbons to provide first, second and third stage oxidation products. Reaction conditions employed in the various hydrocarbon conversion reaction are those heretofore practiced. For example, alkylaromatic isomerization reaction conditions include a temperature of from about 0° to about 535° C., a pressure of from about atmospheric to about 1500 psig., a hydrogen to hydrocarbon mole ratio of from about 0.5 to about 20, and a liquid hourly space velocity of from about 0.5 to about 20. Likewise, a typical hydrocracking operation is effected at a pressure of from about 500 to about 1500 psig., a temperature of from about 200° to about 500° C., a liquid hourly space velocity of from about 4 to about 10, and a hydrogen circulation rate of from about 1000 to about 10,000 standard cubic feet per barrel of hydrocarbon charge (SCF/Bbl).

The alumina composition of this invention is of particular advantage as a support or carrier material for a platinum group metal component, alone or in combination with a tin component, a rhenium component, a germanium component and/or a cobalt component to yield an improved reforming catalyst. The platinum group metal component is suitably composited with the support or carrier material by impregnation and/or ion-exchange techniques familiar to the art. For example, a soluble platinum group compound, that is, a soluble compound of platinum, palladium, rhodium, ruthenium, osmium and/or iridium, is prepared in aqueous solution, and the alumina particles soaked, dipped, or otherwise immersed therein. Suitable platinum group compounds include platinum chloride, chloroplatinic acid, ammonium chloroplatinate, dinitrodiaminoplatinum, palladium chloride, and the like. It is common practice to impregnate the support or carrier material with an aqueous chloroplatinic acid solution acidified with hydrochloric acid to facilitate an even distribution of platinum on the support or carrier material. The support or carrier material is preferably maintained in contact with the impregnating solution at ambient temperature conditions, suitably for at least about 30 minutes, and the impregnating solution thereafter evaporated to dryness. For example, a volume of the particulate support or carrier material is immersed in a substantially equal volume of impregnating solution in a steam jacketed rotary dryer and tumbled therein for a brief period at about room temperature. Steam is thereafter applied to the dryer jacket to expedite evaporation of the impregnating solution and recovery of substantially dry impregnated particles. Thus, a further embodiment of this invention relates to an alumina support or carrier material characterized by a surface area of from about 165 to about 215 m$^2$/g and a pore volume of from about 0.3 to about 0.4 cc/g in the pore diameter range of from about 20 to about 80 Angstroms, said alumina being impregnated with from about 0.1 to about 2.0 wt.% platinum.

As heretofore stated, the alumina composition of this invention is useful as a support or carrier material for a platinum group metal component alone or in combination with a tin component, a rhenium component, a germanium component and/or a cobalt component. The tin, rhenium, germanium and/or cobalt components may be composited with the support or carrier material in any conventional or otherwise convenient manner. Suitable methods include impregnation and/or ion-exchange of the support or carrier material with a suitable compound of one or more of said components in any desired sequence, with or without intermediate calcination. In the impregnation of the support or carrier material, it is a preferred practice to impregnate one or more of said components on said support or carrier material simultaneously with the platinum group metal component from a common impregnating solution. For example, when the added component is tin, stannic chloride is conveniently and advantageously prepared in common solution with chloroplatinic acid, the concentration of each component therein being sufficient to yield a catalyst product containing from about 0.01 to about 2.0 wt.% platinum and from about 0.1 to about 5.0 wt.% tin calculated as the elemental metal. Similarly, when the desired added component is rhenium, perrhenic acid and chloroplatinic acid can be prepared in a common aqueous solution to impregnate the support or carrier material, suitably with from about 0.01 to about 2.0 wt.% platinum and from about 0.01 to about 2.0 wt.% rhenium. Thus, another embodiment of this invention concerns an alumina support or carrier material characterized by a surface area of from about 165 to about 215 m$^2$/g and a pore volume of from about 0.3 to about 0.4 cc/g in the pore diameter range of from about 20 to about 80 Angstroms, said alumina being impregnated with from about 0.01 to about 2.0 wt.% platinum and from about 0.01 to about 2.0 wt.% rhenium.

The tin, rhenium, germanium and/or cobalt components and particularly the tin, germanium and cobalt components are advantageously composited with the alumina by including a suitable acid salt thereof in the aforementioned suspension prepared by admixing a finely divided alpha-alumina monohydrate with an aqueous alkaline solution. For example, an acid salt of tin such as stannous or stannic chloride, may be admixed with said suspension and serve not only as a precursor of the desired tin component, but also as the metal salt of a strong acid as herein contemplated. Following the extrusion process and subsequent calcination, the alumina is obtained comprising the tin component in intimate combination therewith and suitable for further impregnation and/or ion-exchange to incorporate, for example, the platinum group metal component.

The final catalyst composite generally will be dried at a temperature of from about 95° to about 315° C. for a period of from about 2 to about 24 hours or more, and finally calcined at a temperature of from about 375° to about 595° C. in an air atmosphere for a period of from about 0.5 to about 10 hours in order to convert the catalytic component substantially to the oxide form. Although not essential, it is preferred that the resultant calcined catalytic composite be subjected to a substantially water-free reduction step prior to its use in the conversion of hydrocarbons. This step is designed to insure a uniform and finely divided dispersion of the catalytic component throughout the carrier material. Preferably, substantially dry hydrogen is used as the reducing agent in this step. The reducing agent is contacted with the calcined catalyst at a temperature of from about 425° to about 650° C. and for a period of from about 0.5 to about 10 hours. This reduction treatment may be performed in situ as part of a start-up sequence if precautions are taken to predry the plant to a substantially water-free state and if substantially water-free hydrogen is used.

The reforming of gasoline boiling range petroleum fractions to improve the octane rating thereof is a process well known to the petroleum refining industry. The petroleum fraction may be a full boiling range gasoline fraction boiling in the 10°–220° C. range, although it is more often what is called a naphtha fraction, a gasoline fraction having an initial boiling point of from about 65° to about 120° C. and an end boiling point of from about 175° to about 220° C. Reforming conditions generally include a pressure of from about 50 to about 1000 psig. and a temperature of from about 425° to about 595° C.

The catalyst of this invention permits a stable reforming operation to be effected in a preferred pressure range of from about 50 to about 350 psig. utilizing a hydrogen/hydrocarbon mole ratio of from about 0.5 to about 10 and a liquid hourly space velocity of from about 0.5 to about 10. Preferably, a temperature of from about 485° to about 565° C., is employed.

The following examples are presented in illustration of the improvement resulting from the practice of this invention and said examples are not to be construed as an undue limitation on the generally broad scope of the invention as set out in the appended claims.

EXAMPLE I

This example is presented in illustration of one preferred embodiment of the present invention. In the preparation of an acidic alumina hydrosol, aluminum pellets were digested in dilute hydrochloric acid at about 102° C. to obtain a hydrosol containing aluminum in from about a 1.15:1 weight ratio with the chloride anion content thereof. The hydrosol was thereafter cooled to about 15° C. (60° F.) and admixed with a 28% aqueous hexamethylenetetramine solution to provide a hydrosol containing about 12 wt.% hexamethylenetetramine and about 8 wt.% aluminum. This hydrosol was formed into spheroidal hydrogel particles by dispersing the hydrosol as droplets in a gas oil suspending medium contained in a vertical column at about 95° C. The spheroidal hydrogel particles recovered from the bottom of the column were aged in a portion of the forming oil for about 19 hours at a temperature of 100° C. The pH of the oil-aged hydrogel particles registered 6.06. Prior to a final ammonia age, the oil-aged hydrogel particles were immersed and retained in an ammonium chloride-buffered aqueous ammoniacal solution for about 15 minutes at about 95° C. The buffered solution contained 10 wt.% ammonium chloride and sufficient ammonium hydroxide to provide about 0.1 wt.% ammonia. The final ammonia age was then effected over a seven hour period by immersing and retaining the spheroidal particles in an aqueous ammoniacal solution containing sufficient ammonium hydroxide to provide 0.75 wt.% ammonia. The ammonia-aged particles were thereafter water-washed, dried and calcined in air for two hours at 650° C. to yield a product of ⅛" diameter alumina spheres.

The spheroidal alumina product was subjected to an attrition test as follows: The loss on ignition at 900° C. of the spheroidal alumina product was first determined to be less than 6 wt.%. A 70 cc. sample was then gently screened through a U.S. No. 8 screen by hand for 15 seconds for the separation of fines. A 20 cc. sample of the screened spheres was then weighed and charged to a cylinder secured to a vibrating mill. After 15 minutes of vibrations, the cylinder contents were recovered and again gently screened through a U.S. No. 8 screen by hand for 15 seconds. The spheres recovered from the screen, as well as the fines which passed through the screen, were weighed and again checked for weight loss on ignition at 900° C. The weight percent recovery of spheres and fines was in the 99.2–101.2% range. The weight percent attrition was determined as 100 times the weight of the fines divided by the weight of the surviving spheres and fines. The attrition test was repeated three times. The average weight percent attrition was 0.3%.

EXAMPLE II

In this example; ⅛" diameter spheroidal alumina particles were prepared substantially as described in the previous Example I except that the spheroidal hydrogel particles were aged for about 19 hours at 92° C. instead of the stated 100° C. The pH of the oil-aged spheres was, in this case, only 5.35. The influence of the oil-age temperature and the oil-age pH is apparent from the 2.3 wt.% attrition suffered by the spheroidal alumina product of this example when tested in the described manner.

EXAMPLE III

This example demonstrates the significance of the intermediate treatment of the oil-aged hydrogel particles with the ammonium chloride-buffered solution prior to the final ammonia aging. Thus, ⅛" spheroidal alumina particles were again prepared substantially as described in the previous Example II except that the oil-aged hydrogel particles were immersed and retained in the aqueous ammoniacal solution without the benefit of the intermediate ammonium chloride-buffered solution treatment. The weight percent attrition in this case was 59.5%.

I claim as my invention:

1. A method of preparing spheroidal alumina particles which comprises:
   (a) commingling an acidic alumina hydrosol with an ammonia precursor at below gelation temperature;
   (b) dispersing the mixture as droplets in a hot oil bath at a temperature effecting decomposition of said ammonia precursor and gelation of said hydrosol;
   (c) aging the resulting hydrogel spheres in said oil bath at about atmospheric pressure conditions and at a temperature of from about 95° to about 105° C. until said spheres achieve a pH in excess of 6 to about 7.5;
   (d) thereafter displacing said oil bath with an ammonium salt-buffered aqueous ammoniacal solution containing from about 0.5 to about 10 wt.% ammonium salt and from about 0.1 to about 1 wt.% ammonia, and retaining the spheres in said solution for at least about 15 minutes;
   (e) separating and further aging the hydrogel spheres in an aqueous ammoniacal solution containing from about 0.5 to about 3 wt.% ammonia for a period of from about 1 to about 24 hours; and,
   (f) water-washing, drying and calcining the spheroidal alumina product.

2. The method of claim 1 further characterized with respect to step (a) in that said ammonia precursor is hexamethylenetetramine.

3. The method of claim 1 further characterized with respect to step (b) in that said oil bath is maintained at a temperature of from about 50° to about 100° C.

4. The method of claim 1 further characterized with respect to step (c) in that said hydrogel spheres are aged in said oil bath for a period in excess of about 10 hours and until said spheres achieve a pH in excess of 6 to about 7.5.

5. The method of claim 1 further characterized with respect to step (f) in that said spheres are calcined at a temperature of from about 425° to about 750° C.

6. The method of claim 1 further characterized with respect to step (a) in that said acidic alumina hydrosol is an aluminum chloride hydrosol characterized by an aluminum/acid anion weight ratio of from about 1.0 to about 1.5.

7. The method of claim 1 further characterized with respect to step (d) in that said ammonium salt is ammonium chloride.

* * * * *